LOSTUTTER & WOLCOTT.
Plow-Fender.
No. 29,391.
Patented July 31, 1860.
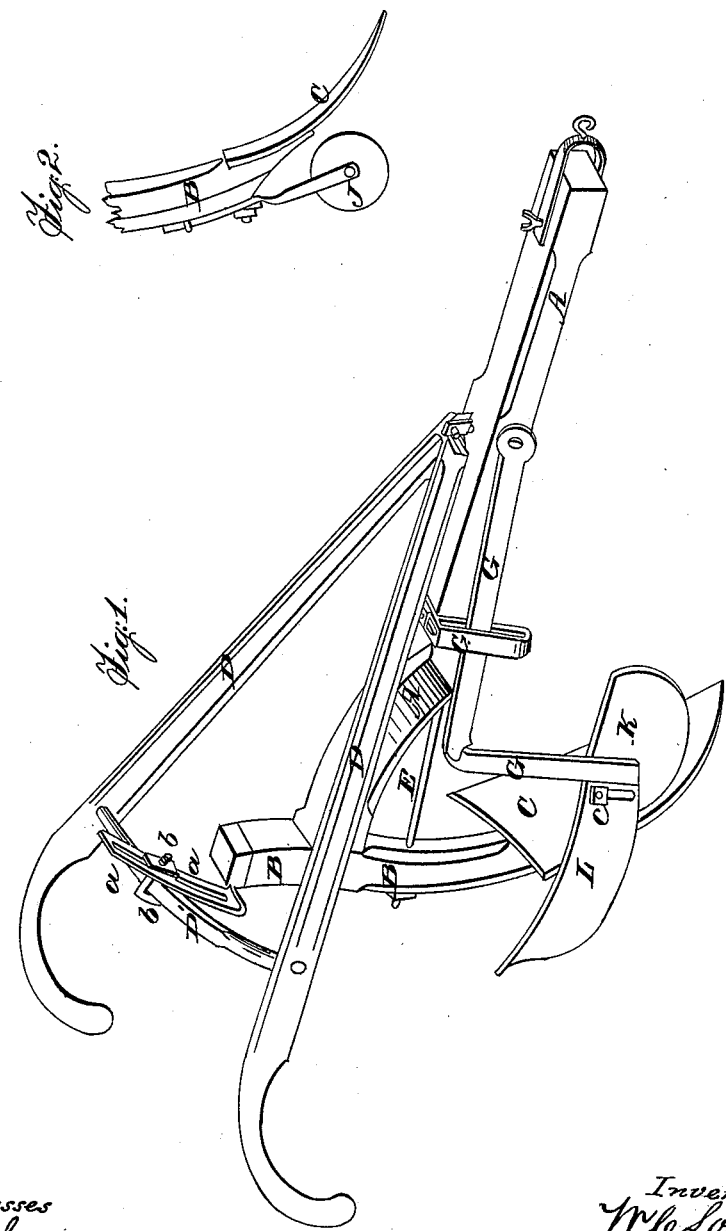

UNITED STATES PATENT OFFICE.

W. C. LOSTUTTER AND S. WOLCOTT, OF RISING SUN, INDIANA.

IMPROVEMENT IN CULTIVATORS.

Specification forming part of Letters Patent No. 29,391, dated July 31, 1860.

*To all whom it may concern:*

Be it known that we, W. C. LOSTUTTER and S. WOLCOTT, both of Rising Sun, in the county of Ohio and State of Indiana, have invented a new and useful Improvement in Shovel-Plows; and we do hereby declare that the following is a full, clear, and exact description thereof, reference being had to the accompanying drawings, forming a part of this specification, in which—

Figure 1 represents a perspective view of our improved plow with its attachments complete. Fig. 2 is a sectional view of the shovel-standard and wheel placed in the heel of the standard.

Similar letters of reference indicate corresponding parts in both figures.

To enable those skilled in the art to fully understand our invention, we will proceed to describe its construction and operation.

In the drawings, A represents the beam, with a clevis on its fore end for attaching the horse, and B is the standard, curved and inclined in the usual manner for carrying the shovel C, which is of any suitable shape or size best adapted to the purpose desired.

D D are the stilts or handles, which are bolted together at their front ends and attached at a suitable point to the beam A by an eyebolt and ring or other suitable device whereby it may have a swivel-joint. The cross-brace D', connecting the two handles together, is formed in a curve described from the pivot at their front end, and this curved brace is attached to the top of the standard by a slotted sector-plate, a, and bolt-strap b, so that the handles may be raised or depressed or set to the right or to the left of the beam A, and rigidly secured in any desirable position by nuts, (shown in the perspective view, Fig. 1.) By this facility of adjustment the plowman can regulate the draft or direction of the plow and have a perfect control over the same.

In the heel of the shovel C, and projecting down from the standard B, is placed a wheel, J, which may be raised or depressed, according to the depth to which it is desired to run the shovel. This wheel regulates the depth for plowing, and serves to assist the plowman in steadying and turning the implement with ease and freedom.

The beam A is curved upward, as shown in Fig. 1, and a rod, E, serves to brace and give strength to its connection with the standard. The object of thus curving the beam A is to have plenty of space above the shovel to prevent weeds or other substances from clogging up the standard, and increasing the draft or injuring the plants by the weeds and rubbish dragging over them. The rod E is placed in a line with the beam, and consequently receives a greater portion of the draft on the beam.

To the side of the beam A is pivoted an arm, G, which passes through a laterally-adjustable stirrup, G', and projects down at right angles and is secured to a guard-plate, K, and from the rear of this plate K proceeds back a vertically-adjustable wing, L, which may be raised or depressed, according to the depth it is desired to plow, and set in its adjustable position by a nut, c. This wing L is curved in such a manner as to receive the earth as it is turned by the shovel, and throw it back in rear of the shovel, and prevent it from falling over on the plants undergoing cultivation. The guard-plate K protects the plants near the point of the shovel, while the adjustable plate L protects them along the side of and in rear of the shovel. This side guard can be adjusted very near to the side of the shovel, so that the plow can pass very close to the plants, and as near as possible to the roots of the plants, with safety. The side guard, being attached to the plow in the manner shown, will rise and fall and accommodate itself to the uneven surface of the ground as the plow passes along the drills.

Having thus described our invention, what we claim, and desire to secure by Letters Patent, is—

The arrangement of the adjustable stirrup G', swinging arm G, guard K, wing L, beam A, brace-rod E, standard B, pivoted handles D D, cross brace D', sector-plate a, and strap b, as and for the purpose herein shown and described.

W. C. LOSTUTTER.
S. WOLCOTT.

Witnesses:
WILLIAM BERKSHIRE,
JAMES S. JELLEY.